R. B. BANKES ET AL

METHOD OF AND APPARATUS FOR TRANSFERRING ARTICLES FROM A WORKHOLDER TO A HANDLING RACK

Filed Oct. 30, 1968 4 Sheets-Sheet 1

INVENTORS
R.B. BANKES
W.F. ESSELUHN
BY E. W. Somers
ATTORNEY

R. B. BANKES ET AL

METHOD OF AND APPARATUS FOR TRANSFERRING ARTICLES FROM A WORKHOLDER TO A HANDLING RACK

Filed Oct. 30, 1968 4 Sheets-Sheet 2

3,555,660

METHOD OF AND APPARATUS FOR TRANSFERRING ARTICLES FROM A WORKHOLDER TO A HANDLING RACK

Robert B. Bankes, Reading, and Werner F. Esseluhn, Wyomissing, Pa., assignors to Western Electric Company, Incorporated, New York, N.Y., a corporation of New York Filed Oct. 30, 1968, Ser. No. 771,943
Int. Cl. B23p *19/00;* H05k *13/04*
U.S. Cl. 29—429 11 Claims

ABSTRACT OF THE DISCLOSURE

Lower jaw members of pairs of upper and lower opposed jaw members are moved relative to said upper jaw members and through slots in a carrier holding a plurality of diodes having leads depending therefrom to grasp an overlay strip and moves the overlay strip away from the diodes. A slotted magnetic camming bar is moved into engagement with the leads to space and hold the leads in alignment with apertures in a handling rack. The handling rack is manipulated to move the leads into the apertures and then to slide the diodes along the slotted openings and off the carrier.

BACKGROUND OF THE INVENTION

(1) Field of the invention

This invention relates to methods of and apparatus for transferring articles from a workholder to a handling rack, and more particularly, relates to methods of and apparatus for supporting a plurality of completed diode subassemblies in spaced parallel relationship on a carrier strip and for then transferring the plurality of leaded diodes from the carrier strip to an apertured handling rack, after which incomplete assemblies are transferred from another handling rack to the carrier strip.

(2) Description of the prior art

In the assembly of a diode, a wafer is bonded to a stud of a diode stud-lead subassembly which has a lead depending downwardly therefrom. The depending lead is made of a material which is suitable for both solder-coating and for use as an electrical conductor. After a wafer has been bonded to the stud, a gold wire is then attached to a top surface of the wafer to complete a diode subassembly after which the diode subassembly is assembled into a casing to complete a diode assembly.

In order to bond the wafer to the stud and the gold wire to the wafer, a plurality of the diode stud-lead subassemblies, having depending leads, are positioned in a plurality of openings in a carrier strip. Each of the openings in the carrier strip has a slot connecting the opening to an edge of the strip. Then, the slotted carrier strip is moved slidably into a pair of opposed, spaced, longitudinal grooves formed in opposed, inner walls of a channel shaped workholder or carrier member. Subsequently, an overlay or masking strip having a plurality of openings spaced longitudinally therealong, is moved slidably into the workholder and is received in the pair of opposed, spaced grooves formed in the inner walls of the workholder so that the overlay strip engages the studs and holds the studs against the carrier strip. The openings in the overlay strip are dimensioned to receive the studs of the stud-lead subassemblies, but are smaller in diameter than a platform which supports the stud. In this way the diode stud-lead subassemblies are supported on the carrier strip and are held between the carrier strip and the overlay strip with the studs protruding through the openings in the overlay strip.

The workholder is then coupled to a commercially-available wafer bonding machine, such as a Lindberg Heavi-Duty Wafer Bonder, Catalogue No. 1203, in which the carrier strip and the overlay strip are withdrawn from the carrier member and indexed in unison through the bonding machine. As the strips are indexed in unison through the bonding machine, the wafers are bonded to the stud subassemblies, after which the strips are conveyed in unison into another workholder. The second workholder is then coupled to a lead bonding machine, such as a Lindberg Heavi-Duty Wire Bonder, Catalogue No. 2203, whereupon the strips are withdrawn from the workholder and indexed in unison through the lead bonding machine in which a gold wire lead is bonded to each of the studs, and then the strips are indexed into still another workholder. When the carrier and overlay strips are moved slidably into the last of the workholders, each of the stud subassemblies has a wafer attached to the stud and a gold wire attached to the wafer.

It has been common practice in the past to load manually and individually the diode subassemblies into the carrier strip, cover the carrier strip with the overlay strip, and then insert the strips together into one of the channel carrier members. In order to remove the diode subassemblies with the wafer and gold wire bonded thereto, it was required that the strips be removed from the carrier member after which the overlay strip was required to have been lifted vertically off the diode subassemblies to prevent damage to the wafer and gold leads. This was a time-consuming and tedious operation and, needless to say, extraordinary precautions were required to avoid damage to the diode subassemblies.

It is an object, therefore, of this invention to overcome the problems involved in handling manually the carrier and overlay strips and to avoid the necessity of transferring the stud-subassemblies individually into, and the diode-subassemblies from, a carrier strip.

Moreover, it is an object of this invention to provide methods of and apparatus for expeditiously transferring a plurality of stud-lead subassemblies from an apertured handling rack into a carrier strip for transmittal through a wafer and lead bonding machine, and for also transferring a plurality of completed diode subassemblies from the carrier strip to the apertured handling rack.

With these and other objects in mind, the present invention contemplates methods of and apparatus for aligning and holding a plurality of leaded diode subassemblies and for then simultaneously transferring the plurality of leaded diode subassemblies into an apertured handling rack.

More particularly, an apparatus for practicing the present invention includes a fixture having spaced guide rails for supporting a carrier strip. Lower jaw members of opposed upper and lower jaw members are moved through selected ones of a plurality of aligned, slots opening to one longitudinal edge of the carrier strip and into engagement with an overlay strip which holds diode subassemblies against the carrier strip. Then the jaw members are moved vertically upward to remove the upper overlay strip, to a position above leads which extend upwardly from the subassemblies through apertures in the overlay strip, whereupon an operator moves pivotally an elongated rack member, having magnetic pole pieces, into engagement with leads depending from the diode subassemblies. The depending leads are held against the pole pieces and are automatically aligned with a plurality of apertures in a handling rack. Simultaneously, the carrier strip is clamped along the other longitudinal edge against one of the guide rails. Then the operator moves pivotally the jaw members, together with the overlay strip held therebetween, and the other guide rail away from the carrier strip to expose the slots. The operator then manipulates the handling rack to position the leads in the apertures and then slide the diode subassemblies along the slots and off the carrier strip.

Other objects and advantages of the present invention will be apparent from the following detailed description when considered in conjunction with the accompanying drawings.

DETAILED DESCRIPTION

Figure 1:
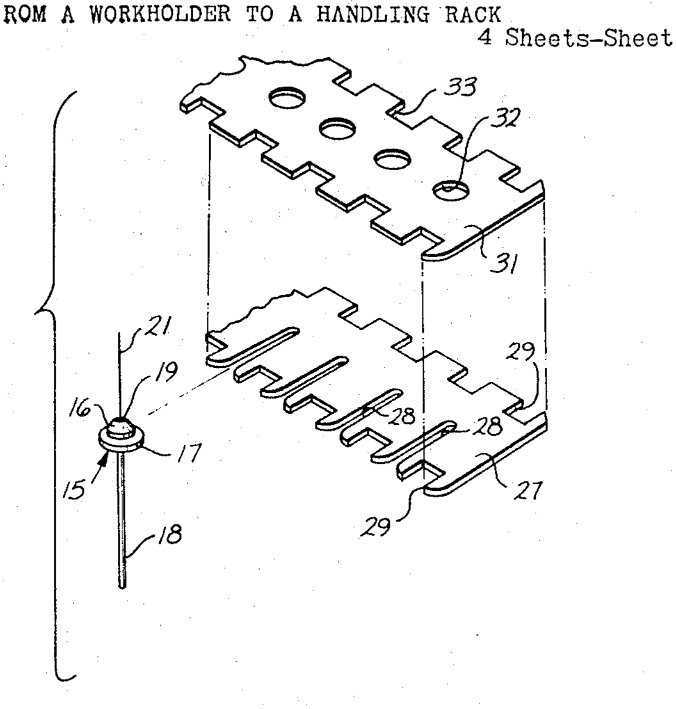
FIG. 1 is an exploded view of a carrier and overlay strip assembly together with a diode subassembly which is received in one of a plurality of slotted openings in the carrier strip and having a stud which is received in one of the aligned openings in the overlay strip.
Figure 2:
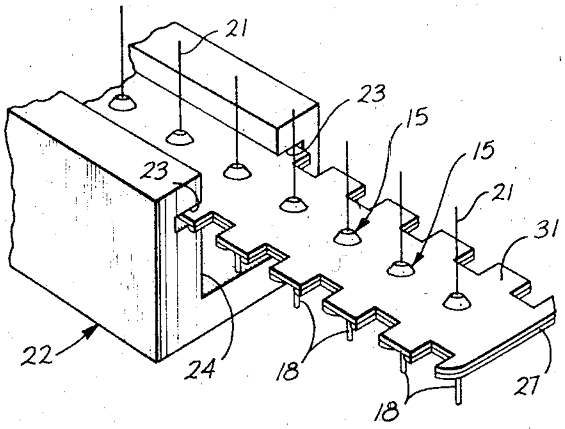
FIG. 2 is an assembled view of the carrier and overlay strip with a plurality of stud-lead subassemblies held therebetween and with the strips supported in a carrier member.

Referring now to FIG. 1, there is shown a detail view of a diode subassembly, designated generally by the numeral 15, and having a stud 16 mounted on a platform 17 from which depends a lead 18. A wafer 19 is positioned on the stud 16 and a gold wire 21 is attached to the wafer. A plurality of partially completed diode stud subassemblies 15 having the lead 18 attached to the platform 17 and stud 16 are loaded into a workholder or carrier number 22 (see FIG. 2) which is then moved indexably through commercially-available bonding machines (not shown) whereat a wafer 19 is bonded to each of the studs 16, and a gold wire lead 21 is bonded to each of the wafers 19. The completed diode subassemblies 15 are unloaded from the workholder 22, subsequent to the bonding operation, and transferred into handling racks 63 (see FIG. 7) and another group of stud subassemblies in another handling rack is transferred to the workholder. As is shown in FIG. 2, the workholder 22 is U-shaped and has a pair of opposed grooves 23 formed longitudinally in opposed inner walls 24 thereof.

A plurality of diode subassemblies 15 are supported in an elongated, carrier strip, designated generally by the numerals 27. The carrier strip 27 has a plurality of spaced slots 28 (see FIG. 1) formed along the length thereof with an inner end of each slot coinciding with the longitudinal axis of the strip. Each of the slots 28 is cut transverse of the lower carrier strip 27 and extends from the longitudinal axis of the strip to the peripheral edge of the strip. A diode subassembly 15 is received in each of the slots 28 with the platform 17 supported on the top surface of the lower carrier strip and with each of the leads 18 depending downwardly through one of the slots. The lower carrier strip 27 is also formed with a plurality of rack notches 29 cut along each longitudinal edge thereof. The rack notches 29 are required for indexing the carrier strip 27 through the commercially-available bonding machines (not shown).

In order to hold the stud subassemblies 15 in the lower carrier strip 27, as the lower carrier strip is moved intermittently through the bonding machine (not shown), a masking or overlay strip 31 is placed above the carrier strip and in engagement with the stud subassemblies 15. The overlay strip 31 has a plurality of spaced openings 32 formed therealong with each of the openings 32 aligned with one of the stud subassemblies 15 and for receiving the studs 16. In this way, as the carrier strip 27 is moved indexably through the bonding machine (not shown), a wafer 19 is bonded to each of the studs 16 and a gold wire lead 21 is bonded to each of the wafers 19. The overlay strip 31 is also formed to be congruent with the carrier strip 27 and has a plurality of notches 33 cut along each longitudinal edge thereof which coincide with the notches 29 in the carrier strip.

One of the carrier strips 27, loaded with stud subassemblies 15, and having an overlay strip 31 holding the stud subassemblies on the carrier strip is then moved into one of the workholders 22 so that the carrier and overlay strips are received in the grooves 23. After the carrier and overlay strips 27 and 31, respectively, have been moved indexably from the carrier 21 through the bonding machine (not shown) and into another workholder during which time the wafers 19 and gold wire leads 21 are bonded to the stud subassemblies 15, the workholder now containing a plurality of completed diode subassemblies is positioned in a nest, designated generally by the numerals 34, adjacent a transfer fixture, designated generally by the numerals 40 (see FIG. 3).

The workholder 22 is positioned adjacent the transfer fixture 40 so that the carrier and overlay strips 27 and 31, respectively, may be moved in unison from the workholder into the transfer fixture. In connection therewith, one of the grooves 23 is aligned with a ledge or first guide rail 41 formed on one side of a supporting wall member, designated generally by the numerals 42 (see FIG. 5). The wall member 42 is formed on a length sufficient to receive and support the entire carrier strip 27 from the U-shaped workholder 22. The other one of the grooves 23 is aligned with a seat or second guide rail 43 in a second wall member, designated generally by the numerals 44, which is opposed to and spaced from the first wall member 42. The first wall member 42 is attached to a fixed frame, designated generally by the numerals 46 which is supported from a base 45.

The wall member 44 is mounted on a movable front frame, designated generally by the numerals 47. Also mounted on the frame 47 and protruding through spaced openings 48 in the second wall member 44 are a pair of lower jaw members 49. The lower jaw members 49 are positioned so that when the carrier strip 27 has been moved out of the U-shaped workholder 22 and into the transfer fixture 40, each of the lower jaw members has spaced fins 50 which are aligned with two of the slotted openings 28 in the carrier strip. Each of the lower jaw members 49 are fixedly mounted on one of a pair of guide rods 51, each of which is slidably movable through a lower and upper guide blocks 52 and 53, respectively, (see FIG. 3). The lower and upper guide blocks 52 and 53 are attached to the front movable frame 47.

The guide rods 51 also extend through openings formed in an actuator bar 54 and are secured within the openings to the actuator bar. Moreover, an upper jaw member 56 is slidably mounted on each of the guide rods 51 and is spaced from the actuator bar 54 by a compression spring 57 which is concentrically disposed about each of the guide rods 51 (see FIG. 5). In addition, each of the upper jaw members 56 is aligned with the lower jaw members 49. Initially, before the transfer fixture 40 is operated, the lower jaw members 49 are supported on the top surface of the lower guide block 52 (see FIG. 5). The upper jaw members 56 are urged toward the lower jaw members 49 by the springs 57 but spaced therefrom by the upper jaw members engaging a stop 58 which is attached to and extends upwardly from the lower guide block 52. The stop 58 is adjustable and may be moved upwardly or downwardly with respect to the lower guide block 52 to move the upper jaw members in an unoperated condition further away from or closer to the lower jaw members 49.

Figure 5:
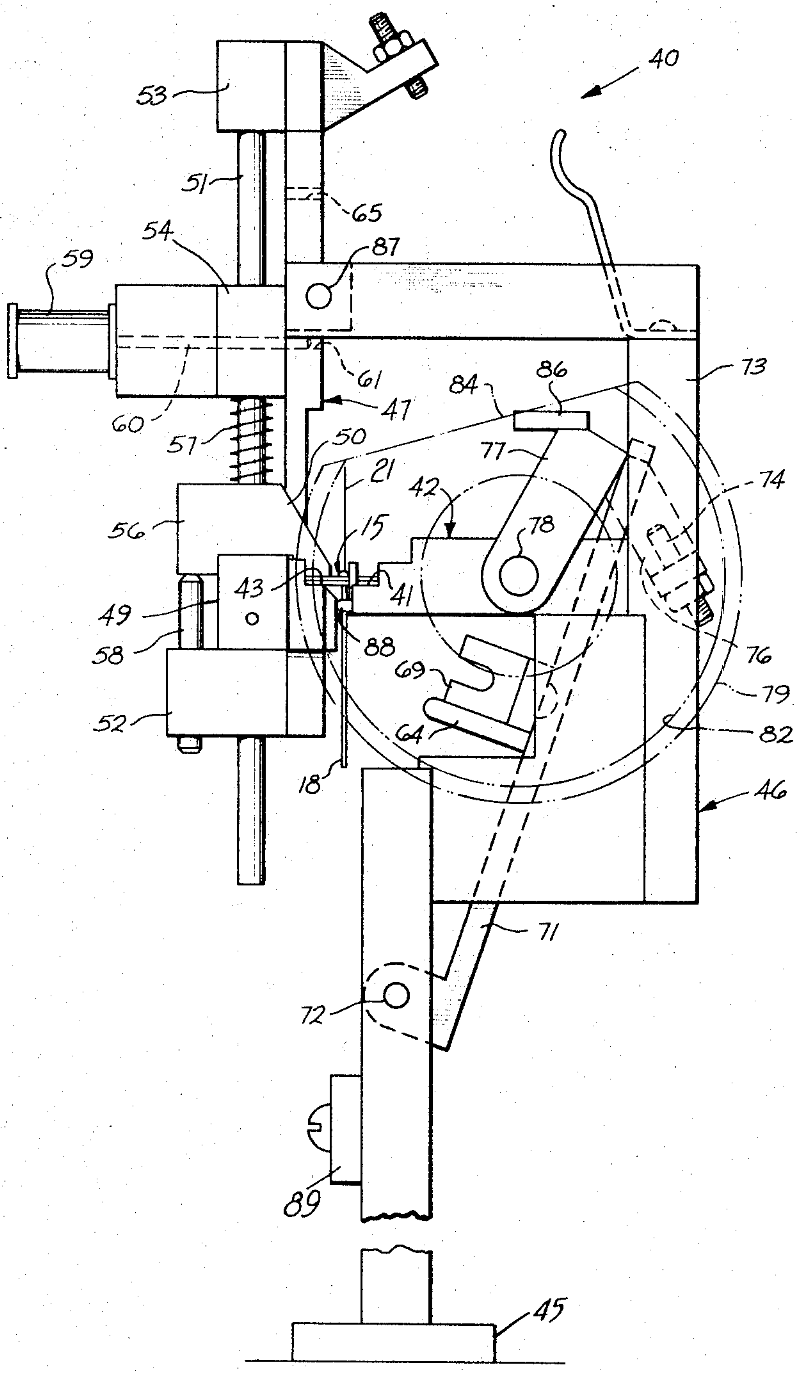
FIGS. 5–7 are a sequence of views showing the operation of the fixture shown in FIGS. 3 and 4 for transferring a plurality of completed diode subassemblies from the carrier strip to a handling rack.

By grasping a knob 59 which is attached to the actuator bar 54, and then pulling the knob, an operator may disengage a spring loaded locking pin 60 which extends through the actuator bar from a lowermost locator cavity 61 in the frame 47 (see FIG. 5). Then the operator may move the knob 59 upwardly to raise the lower jaw members 49 upwardly into engagement with the upper jaw member 56 which are spring loaded by springs 57 to clamp the overlay strip 31 between the carrier strip and the overlay strip. Continued upward movement of the knob 59 and actuator bar 54 raises the upper and lower jaw members 56 and 49, respectively, in unison until the spring biased locking pin 60 is urged inwardly to lock into an uppermost locator cavity 65 (see FIG. 5).

Figure 8:
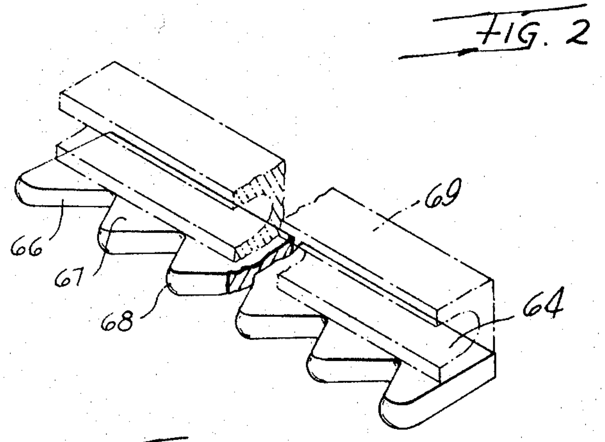
FIG. 8 is a detail view of a camming bar which is used to align leads depending from the diode subassemblies with apertures in the handling rack.

In order to align the leads 18 depending from the diode subassemblies with a plurality of apertures 62 formed in a handling rack 63 (see FIG. 7), the transfer fixture 40 includes a camming bar 64 (see FIGS. 5 and 8). The camming bar 64 has a plurality of spaced openings 66 cut along an end edge thereof, to form a plurality of teeth 67 along the camming bar 64. Each of the teeth 67 is formed with peripheral camming edges 68 for engaging the leads 18 and guiding the leads into the openings 66.

To hold the leads 18 which have been moved into the openings 66 in the camming bar 64, the camming bar is attached to the underside of a U-shaped elongated, permanent magnet 69 (see FIG. 5). The permanent magnet 69 has spaced pole pieces which engage each of the leads 18 (see FIGS. 6 and 7).

In order to move the camming bar 64 into engagement with the leads 18, the camming bar and magnet 69 are mounted in a lever 71, which is mounted pivotally at one end thereof on a pin 72 attached to the frame 46. The lever 71 normally rests against a backstop 73 and is urged forward in a counterclockwise direction as viewed in FIG. 5 by an actuator bolt 74 which extends from a projecting member 76 attached to a turning bar 77. The turning bar 77 is mounted rotatably at ends thereof (see FIG. 4) on pins 78 which extend from the rear wall member 42. Moreover, the turning bar 77 is attached at the right hand end thereof, as viewed in FIG. 4, to a face plate 79 having a knurled hand knob 81 mounted thereon for rotating the face plate to the turning bar 77.

Figures 3, 4:
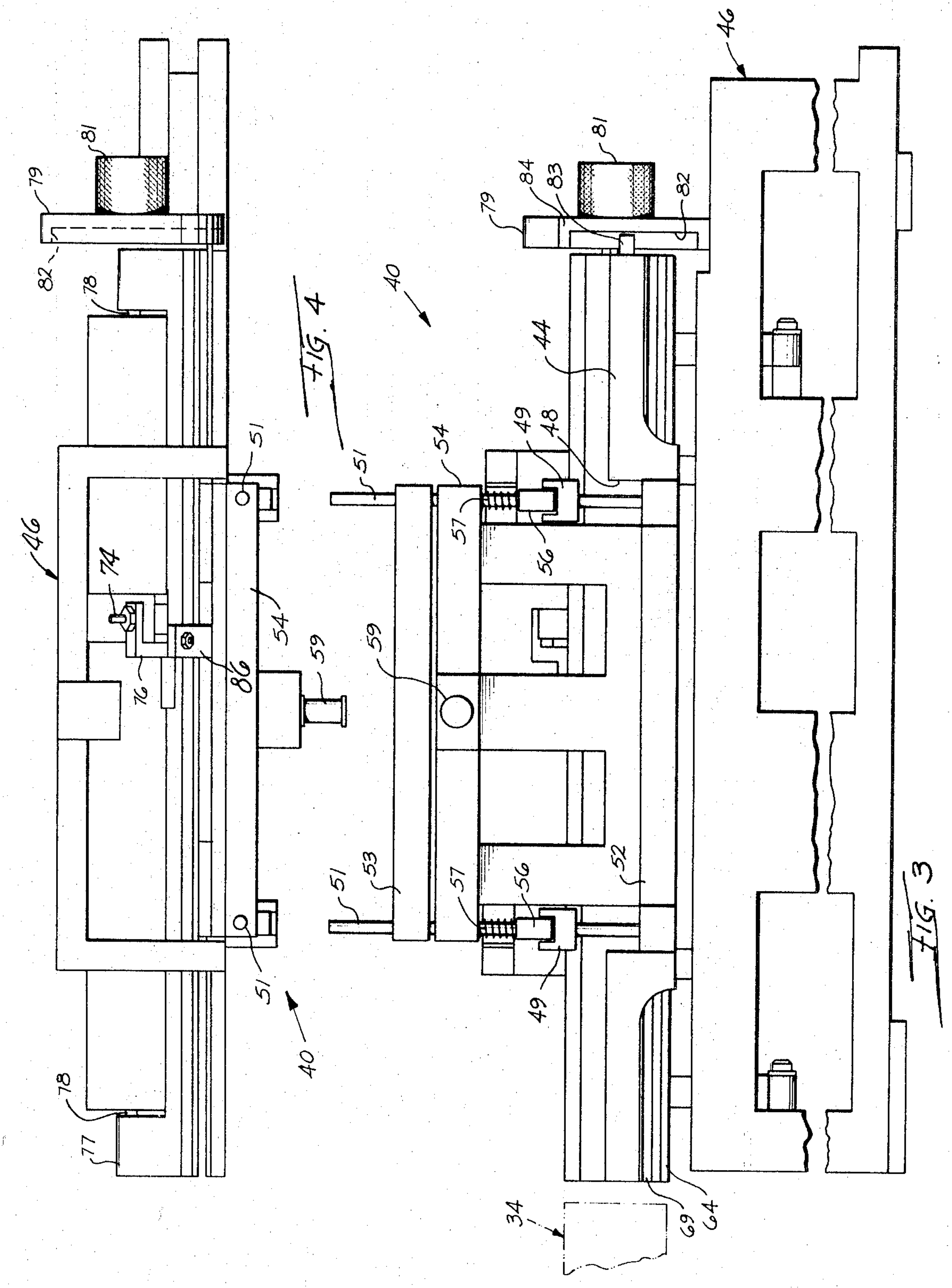
FIG. 3 is an elevational view of a fixture which may be used to practice the principles of the method of this invention.
FIG. 4 is a plan view of the fixture shown in FIG. 3.

Additionally, as can best be seen in FIGS. 4 and 5, the face plate 79 is generally circular and has a disc-shaped opening 82 cut on the inner surface thereof to receive a stud 83 projecting from the right hand end of the front wall members 44, as viewed in FIG. 3. The face plate 79 is cut along a chordal line to form a flat surface 84 and to expose the opening 82. The stud 83 and opening 82 are arranged so that the front frame 47 cannot be swung out away from the carrier strip 27 until the face plate 79 has been turned to disengage the opening 82 from hte stud 83.

Figures 6, 7:
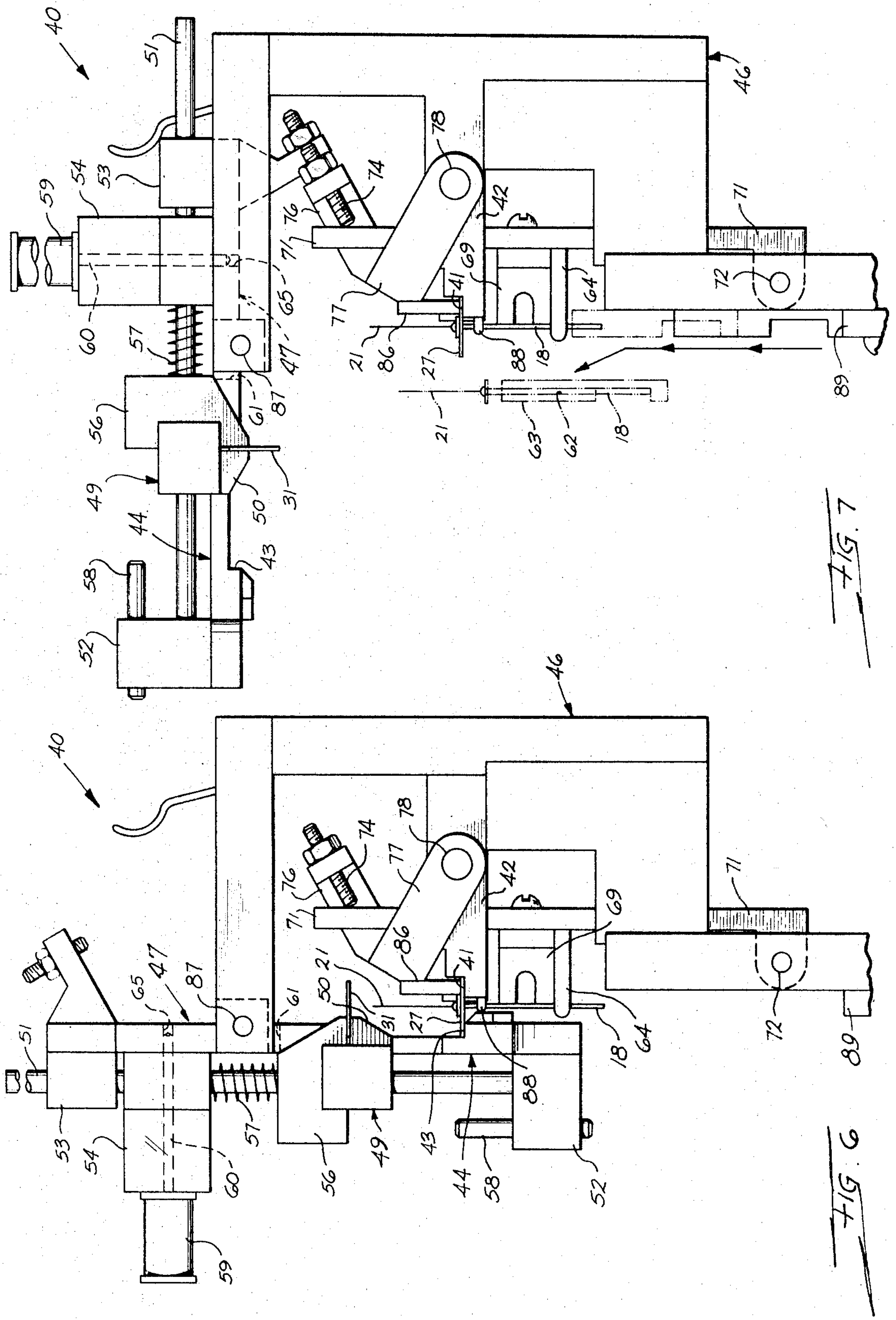

As the face plate 79 is moved rotatably in a counterclockwise direction as viewed in FIG. 5, a clamping bar 86 which is attached to the free end of the turning bar 77 is moved downwardly to press and clamp the carrier strip 27 against the ledge 41 (see FIG. 6). The rotation of the face plate 79 moves the actuator bolt 74 into engagement with the lever 71 to move the lever in a counterclockwise direction and engage the camming bar 64 with the leads 18. When the camming bar 64 is moved into engagement with the leads 18, the leads are attracted to and held by the magnet 69 (see FIG. 6). This arrangement prevents the diode subassemblies 15 from sliding out of the slots 28 in the carrier strip 27 when the overlay strip 31 is removed.

In order to move the wall member 44 and jaws 49 and 56 out of vicinity of the carrier strip 27, the front frame 47 is mounted pivotally on pins 87 which extend forwardly from opposite ends of the frame 46 (see FIG. 5). The frame 47 is spaced from the frame 46 by an adjustable spacer button 88 which protrudes from the rear wall member 42 toward and into engagement with vertical face of the front wall member 44 (see FIG. 6). The adjustable spacer button may be turned to extend a predetermined distance past the rear wall member 42. In this way, after the movable frame 47 has been swung counterclockwise as viewed in FIG. 5 to expose the diode subassemblies, the frame 47 may subsequently be returned to the position shown in FIG. 5 without crushing the carrier strip 27.

OPERATION

In describing the operation of the aftermentioned apparatus, it will be assumed that an operator has loaded a plurality of diode subassemblies 15 into a carrier strip 27 with each of the diode subassemblies received in one of the slots 28 so that the platforms 17 and studs 16 are supported on the top surface of the carrier strip and the leads 18 depending downwardly and through the slots 28. Moreover, the operator will have placed the overlay strip 31 over the carrier strip 27 so that the studs 16 protrude through the openings 32 in the overlay strip. Then the carrier strip 27 and the overlay strip 31 are moved in unison into the grooves 23 respectively in one of the workholders or carrier members 22.

Subsequently, the carrier strip 27 and overlay strip 31 are moved indexably from the workholder 22 and into a commercially-available bonding machine (not shown) where a diode wafer 19 is bonded to each of the studs 16 as the strips 27 and 31 are moved into another second workholder 22. Then the strips 27 and 31, together with the diode subassemblies 15, are withdrawn from the second workholder 22 and moved indexably through a commercially-available bonding machine (not shown) where a gold wire 21 is attached to each of the wafers 19. As the carrier strip 27 and the overlay strip 31 are moved out of the bonding machine (not shown), the strips are received in the grooves 23 of a third workholder 22.

Then an operator grasps the third workholder 22 which now contains the carrier strip 27 and the overlay strip 31 and a plurality of completed diode subassemblies 15. The operator transfers the workholder 22 and completed diode subassemblies 15 from the bonding area to a nest 34 which is positioned adjacent a transfer fixture, designated generally by the numeral 40.

The transfer fixture 40 is used to transfer the plurality of completed diode subassemblies 15 from the workholder 22 to a handling rack 63 and then to transfer a plurality of incompleted diode stud subassemblies from another handling rack to the same carrier strip 27. In the first step of practicing the method of this invention, the operator adjusts the workholder 22 in the nest 34 to align the carrier strip 27 with the ledge 41 of the wall member 42 and with the seat 43 of the other opposed wall member 44.

Then the operator moves slidably, and in unison, the lower carrier strip 27 and overlay strip 31 together with the completed diode subassemblies 15, to the right, as viewed in FIG. 3, out of the workholder 22 into the transfer fixture 40 so that the lower carrier strip is supported along one longitudinal edge on the ledge 41 and along the other longitudinal edge on the seat 43 (see FIG. 5).

After the operator has moved the carrier strip 27 and overlay strip 31 completely out of the workholder 22 and into the transfer fixture 40, the spaced fins 50 of the lower jaw members 49 are aligned with one of the slots 28 in the carrier strip beneath the overlay strip. The operator then grasps the knob 59 on the actuator bar 54 to pull and withdraw the locking pin 60 from the lowermost locator cavity 61 in the frame 47 and then moves the actuator bar upwardly as viewed in FIG. 5. As the actuator bar 54 is moved upwardly, the guide rods 51, which are secured to the actuator bar, are moved slidably within the bores formed in the lower and upper guide blocks 52 and 53, respectively. The fins 50 of the lower jaw members 49 which are fixedly attached to the guide 51 are also moved upwardly through the slots 28 in the carrier strip 27 until the lower jaw members clamp the longitudinal edges of the overlay strip 31 against the lower surface of the spring-loaded upper jaw members 56.

Then as the operator continues to move the knob 59 upwardly, the lower and upper jaw member 49 and 56 which are clamping the overlay strip 31 therebetween under the urging of the compression springs 57, which are concentrically disposed about the guide rods 51, are moved in unison with the actuator bar 54 and the compression springs. The guide rods 51 which are fixedly secured to the lower jaw member 49 and the actuator bar 54 are also moved slidably upward within the lower and upper guide blocks 52 and 53 respectively. The upper and lower jaw members 49 and 56 are moved upward until the overlay strip 31 which is clamped therebetween is moved over the tops of the gold wires 21 which project upwards from the diode subassemblies 15 now held in the carrier strip 27 (see FIG. 6).

After the operator has cleared the overlay strip 31 of the gold wires 21, the operator releases the knob 59 whereupon the locking pin 61 is then spring biased into the uppermost locator cavity 65 in the frame 47 to hold the guide rods 51 in an upward position during the subsequent transfer operation.

Then, in the next step in practicing the method of this invention, the operator grasps the knurled knob 81 of the face plate 79 and turns the knob and face plate in a counterclockwise direction as viewed in FIG. 5. As the knob 81 and face plate 79 are rotated, the actuator bolt 74 on the turning bar 77 engages the upper end of the lever 71 and moves pivotally the lever counterclockwise about the pin 72 as viewed in FIGS. 5 and 6. After a predetermined rotation of the turning bar 77, the clamping bar 86 is moved into engagement with the longitudinal edge of the carrier strip 27 to clamp the carrier strip against the seat 41. Simultaneously, the leads 18, depending downwardly from the diode subassemblies 15, and now in the carrier strip 27, are magnetically attracted and cammed against the beveled camming edges 68 of the camming bar 64 which is attached to the magnetic bar 69 to move the leads into the openings 66 and thereupon align the leads in parallel relationship with each other. The leads 18 are attracted into and seated in the openings 66 of the camming bar 64, and moved into engagement with the magnet 69 which holds the leads within the openings of the camming bar as the camming bar and magnet assume the positions shown in FIG. 6.

As described hereinbefore and as seen in FIG. 3, the frame 46 has a stud 83 at the right hand end thereof which is received in the opening 82 in the face plate 79 and which rides along an inner circular wall of the face plate. This arrangement serves as a safety interlock in that the frame 47 may not be swung out pivotally until the face plate 79 is rotated in a counterclockwise direction to move the flat 84 of the face plate adjacent the stud 83 to free the stud for movement away from the face plate. Otherwise the frame 47 could be moved pivotally to remove the seat 43 from under the longitudinal edge of the carrier strip 27 before the carrier strip is clamped against the ledge 41 of the wall member 42 which could result in the spilling of the diode subassemblies 15 and the strip 27 from the fixture 40.

With the face plate 79 now rotated in a counterclockwise direction, the safety interlock is inoperative and the operator now grasps the knob 59 of the actuator bar 54 and pushes against the frame 47 to swing the frame about the pins 86 and move the overlay 31, now in a raised position above the gold wires 21, away from the diode subassemblies 15.

Referring now to FIG. 7, the operator grasps a handling rack 63 and places the handling rack in engagement with the frame 46 and supported by the bar 89. Next, the operator aligns the openings 62 in the handling rack with the stud leads 18 depending downwardly from the diode subassemblies 15, after which the handling rack 63 is moved upwardly to move the stud leads 18 into the apertures 62. The operator then manipulates the handling rack 63 and the subassemblies 15 away from the magnet 69 to slide the leads 18 out of the slots 28 and the platforms 17 and studs 16 off the carrier strip 27. In this way the operator has now transferred the plurality of completed diode subassemblies 15 from the carrier strip 27 to the handling rack 63 which may then be placed in other apparatuses to complete the diode assembly.

The operator then grasps another handling rack 63, having a plurality of diode stud subassemblies 15, which have not yet been assembled with the wafer 19 and gold leads 21. The operator manipulates the handling rack to slide the stud 16 and platform 17 along the top surface of the carrier strip 27 which is still clamped in the transfer fixture 40 with each of the depending leads 18 moving laterally within one of the slots 28. After the diode subassemblies 15 have been moved to the arcuate portions of the slots 28, the operator moves the handling rack downwardly to withdraw the depending leads 18 from the aperture 62 in the handling rack. This step is carefully performed so that as the handling rack 63 is moved slidably along the leads 18, the leads are pushed inwardly into the openings 66 in the camming bar 64 so that after the handling rack has been removed completely, the leads are spaced along the camming bar and held against the magnet 69.

In the next sequence of steps the operator retraces the operations described hereinbefore which are used to unload the carrier strip 27. First, the frame 47 is moved counterclockwise about the pintles 86, as viewed in FIG. 7, until the vertical face of the wall member 44 engages the button 88 to move the overlay strip 31 over, but spaced above, the carrier strip 27 and to return the seat 43 to a position under the carrier strip. With support now reinstated for the carrier strip 27 and the diode subassemblies 15 now held therein, the operator turns the knob 81 and face plate 79 to move clockwise the turning bar 77 and actuating bolt 74. As the turning bar 77 is moved rotatably in the clockwise direction, the clamping bar 86 is moved out of engagement with the carrier strip 27 and the turning bar 77 engages the lever 71 to move the lever and the magnet 69 and the camming bar 64 out of engagement with the stud leads 18 depending downwardly from the diode subassemblies 15 (see FIG. 5).

Finally, the operator grasps the knob 59 to disengage the locking pin 60 from the uppermost locating cavity 65 in the frame 47 and then moves the actuator bar 52 and guide rods 51 in a downwardly direction as viewed in FIG. 5 until the upper jaw members 50 are supported on the stop members 56. In order to move the lower jaw members 49 out of engagement with the overlay strip 31, the actuator bar 52 is moved further downwardly until the spring-biased knob 59 is released to urge the knob projection into the lowermost locating cavity 61. At this time the lower jaw members 49 are supported in the lower guide blocks 52. With the lower jaw members 49 now held out of engagement with the carrier and overlay strips 27 and 31, respectively, and supported on the lower guide blocks 52, the operator may now slide the carrier strip and overlay strip in unison together with the incompleted diode subassemblies 15 along the ledge 41 and seat 43 to the left as viewed in FIG. 3 and into spaced grooves 23 of the U-shaped workholder 22 now in position in the nest 34.

Then the workholder 22 is transferred to the bonding machines (not shown) as described hereinbefore to bond the wafer 19 and the gold wire leads 21 to each of the diode subassemblies 15 whereafter the operation is repeated to transfer the completed diode subassemblies 15 from the workholder 22 into a handling rack 63.

It is to be understood that the above-described embodiments are simply illustrative of the invention and that many other embodiments can be devised without departing from the scope and spirit of the invention.

What is claimed is:

1. In a method of transferring articles, held in aligned spaced relation on a carrier strip by an overlay strip, to a handling rack;
   - supporting said carrier strip along spaced guide rails;
   - removing said overlay strip;
   - clamping said carrier strip against one of said spaced guide rails while maintaining said articles in said spaced aligned relation;
   - removing said other of said spaced guide rails from engagement with said carrier strip; and
   - moving said articles relative to, and out of engagement with, said carrier strip while holding said articles in said aligned spaced relationship to load said handling rack.

2. In a method of loading a plurality of articles, having body portions thereof supported on a carrier strip covered by an overlay strip and having leads depending from said body portions through slots cut transverse of said carrier strip, into a handling rack, having a plurality of apertures;
   - supporting said carrier strip on spaced parallel ledges along the longitudinal edges of the carrier strip;
   - moving spaced jaws through ones of said slots in said carrier strip to grasp said overlay strip;
   - raising said overlay strip above said articles;
   - clamping said carrier strip against one of said ledges while aligning said depending leads of said articles with said apertures in said handling rack;
   - moving pivotally the other one of said spaced parallel ledges out of engagement with said carrier strip;
   - inserting said leads in said apertures; and then
   - manipulating said handling rack to slide said articles along said slots and off said carrier strip.

3. In a method of loading a plurality of paramagnetic articles, having a body portion thereof supported in spaced relation along a carrier strip which is covered with an overlay strip and said articles having lead wires extending upwardly through openings in said overlay strip and having portions depending downwardly through slots cut transverse of the carrier strip said slots having inner ends along the longitudinal axis of the carrier strip and outer ends opening to one of the longitudinal edges of the strip, into a handling rack having a plurality of apertures;
   - supporting said carrier strip on spaced guide rails along the longitudinal edges of the strip;
   - lifting said overlay strip out of engagement with said articles and above said lead wires;
   - clamping said carrier strip against one of said guide rails;
   - magnetically holding said depending portions of said articles in spaced relation while aligning said depending portions with said apertures;
   - removing the other of said guide rails from engagement with the one longitudinal edge of said carrier strip to expose the open ends of said slots in said carrier strip;
   - manipulating the handling rack to insert said depending portions into said apertures; and then
   - pulling the rack transversely off and away from the carrier strip to slide said articles along said slots and off said carrier strip.

4. In a fixture for transferring a plurality of articles held in openings formed along one longitudinal edge of a first strip by a second strip and having leads depending from said articles through said openings;
   - means for supporting said first strip along said one longitudinal edge thereof;
   - means mounted on said supporting means for removing said second strip;
   - means supporting the first strip along the other longitudinal edge thereof for holding said first strip after said supporting means has been moved out of engagement with said first strip and for aligning said leads; and

- means mounting said supporting means for moving said supporting means out of engagement with said first strip to expose said openings to permit removal of said articles from said first strip.

5. In a fixture for transferring articles having body portions spanning slotted openings in a carrier strip and held thereagainst by an overlay strip and having leads depending from the body portions through the slotted openings;
   - first guide means for supporting said carrier strip along one longitudinal edge thereof;
   - second guide means spaced from said first guide means and mounted for movement relative thereto for supporting the carrier strip along the other longitudinal edge thereof;
   - means mounted on said second guide means for moving said overlay strip a predetermined distance from said articles;
   - means for holding said carrier strip in engagement with said first guide means and for engaging said leads to hold said leads in spaced parallel relationship; and
   - means for moving second said guide means relative to said first guide means to expose said slotted openings in said carrier strip to permit the articles to be moved in said slots transverse of and off said carrier strip.

6. In a fixture for transferring articles held in spaced relation between a carrier strip and an overlay strip, said articles supported on said carrier strip and having portions depending downwardly therefrom through slots in said carrier strip and having leads extending upwardly through apertures in said overlay strip, said slots in said carrier strip opening to one longitudinal edge thereof;
   - first and second spaced guide means for supporting said carrier strip, said second guide means mounted for movement relative to said first guide means;
   - jaw means having lower portions thereof moved through predetermined ones of said slots in said carrier strip for grasping said overlay strip and for lifting said overlay strip above said leads;
   - means for holding said carrier strip in engagement with said first guide means and for aligning said articles in a predetermined spaced relationship; and
   - means for moving said second guide means out of engagement with said carrier strip to expose said carrier strip and permit movement of said articles along said slots and then off said carrier strip.

7. In a fixture for transferring a plurality of paramagnetic articles, each having leads extending therefrom, in parallel aligned relationship with each other, from a carrier strip having a plurality of spaced slots opening to one longitudinal edge of said carrier strip formed therein with each of said articles supported from said carrier strip, and covered with an overlay strip to hold said articles in said slots, the improvement comprising;
   - means for supporting said carrier strip along the one longitudinal edge thereof;
   - means spaced from said supporting means for holding said carrier strip along the other longitudinal edge thereof;
   - means mounting said supporting means for movement relative to said holding means;
   - slidably mounted jaw means having lower portions thereof moved through ones of said slots in said carrier strip for clamping said overlay strip against upper portions thereof and for raising said overlay strip above said articles;
   - magnetic means cammed into engagement with said leads depending from said articles for holding said leads in spaced, substantially parallel, alignment with each other; and
   - means operated subsequent to the aligning of said leads for moving said supporting means relative to said holding means to expose the open ends of the slots.

8. In a fixture for transferring paramagnetic articles having leads depending downwardly and extending upwardly therefrom to a handling rack having a plurality of spaced apertures;

a first strip having a plurality of spaced slots cut transversely from one edge of the first strip to a longitudinal axis thereof for receiving one of said articles in each of said slots with said leads depending downwardly therefrom through said slots;

a second strip having a plurality of spaced openings aligned with said slots and overlying said articles in said first strip to hold said articles in said first strip with the leads extending upwardly through said openings;

fixed means for supporting said first strip along the one longitudinal edge thereof;

pivotally movable means spaced from said fixed means for supporting said first strip along the other longitudinal edge thereof;

means moved through predetermined ones of said slots in said first strip for grasping said second strip to lift said second strip from said first strip and above said upwardly extending leads;

means movable into engagement with said first strip for holding said first strip against said fixed means;

magnetic means rendered effective by said means clamping said first strip for aligning said depending leads with said apertures and for holding said depending leads aligned to facilitate inserting said depending leads into said apertures; and means for swinging said pivotally movable means away from said fixed means to expose said slots and permit said articles to be slidably moved along said slots and out of engagement with said first strip.

9. In a fixture for transferring a plurality of paramagnetic articles supported on a carrier strip and covered with an overlay strip, with the articles having leads depending downwardly therefrom through slots cut transversely in the carrier strip and opening to one longitudinal edge thereof, into spaced apertures in a handling rack;

first guide means for supporting said carrier strip along one longitudinal edge of said strip;

second guide means spaced from said first guide means and movable pivotally relative to said first guide means for supporting said carrier strip along the other longitudinal edge thereof;

jaw means having upper and lower portions mounted slidably on said second guide means for moving said lower jaw portions through predetermined ones of said slots to clamp said overlay strip against said upper portions and for further movement in unison relative to said carrier strip to raise said overlay strip above said articles;

means operated subsequent to the raising of said overlay strip above said articles for holding said carrier strip in engagement with said first guide means and for combing and magnetically holding said leads in alignment with said apertures to facilitate inserting said leads in said apertures; and means attached to said jaw means for moving pivotally said second guide means to expose the open ends of said slots to facilitate the manipulation of said handling rack whereby an operator inserts said leads in said apertures and then slides said articles along said slots and then off said carrier strip.

10. In a fixture for transferring paramagnetic articles, held in spaced relation between a carrier strip and an overlay strip to a handling rack having a plurality of spaced bores, said articles supported on said carrier strip and having leads depending therefrom through slots in said carrier strips and having portions extending upwardly therefrom through openings in said overlay strip aligned with said slots, said slots cut transversely in said carrier strip from one longitudinal edge thereof to the longitudinal axis of the carrier strip;

pivotally mounted means for supporting said carrier strip along the said one longitudinal edge thereof;

fixed means spaced from said pivotally mounted means for supporting said carrier strip along the other longitudinal edge thereof;

opposed upper and lower jaw members attached to said pivotally mounted supporting means and slidably mounted for movement in a vertical direction, said upper jaw members positioned above said overlay strip and said lower jaw members beneath said carrier strip and aligned with said upper jaw members and ones of said slots;

means mounting said opposed jaw members for movement relative to one another and for moving said lower jaw members upwardly through said ones of said slots in said carrier strip to clamp said overlay strip against said upper jaw members and for then moving said overlay strip above said upwardly extending portions of said articles;

an elongated rack member having a plurality of teeth formed therealong with the openings between said teeth in alignment with said bores in said handling rack;

magnetic means attached to said rack member for attracting said leads into said openings, between said teeth in said rack member and for holding the leads therein in spaced parallel relationship with each other;

means mounting said rack for moving said rack into engagement with said depending leads to cam and urge said leads into said openings whereupon said leads are held magnetically in alignment with said bores in said handling rack;

means attached to said moving means for clamping said carrier strip to said fixed supporting means subsequent to the removal of said cover strip; and means for moving pivotally said supporting means from engagement with said carrier strip to expose said slots whereby an operator moves the handling rack over said leads to insert said leads in said bores and slides said articles along said slots off said strip.

11. In a fixture for transferring articles having body portions thereof supported on a carrier strip and leads depending from said body portion through slotted openings cut transverse of said carrier strip, while maintaining said articles in an aligned spaced relationship;

first and second spaced guide means for supporting said carrier strip;

means for holding said carrier strip in engagement with said second guide means and for engaging said leads to hold said articles in said aligned spaced relationship; and means for moving said first guide means out of engagement with said carrier strip to expose the slotted openings in said carrier strip and permit movement of said articles relative to said carrier strip.

References Cited

UNITED STATES PATENTS

| | | | |
|---|---|---|---|
| 3,169,308 | 2/1965 | Goran, Jr. | 29—429 |
| 3,407,949 | 10/1968 | Fegley | 29—203X |
| 3,416,214 | 12/1968 | Clark | 29—203 |
| 3,426,411 | 2/1969 | Lagsdin | 29—235 |

THOMAS H. EAGER, Primary Examiner

U.S. Cl. X.R.

29—203, 626